July 12, 1960  T. HEIL  2,944,809
PORTABLE PACKING SCALES
Filed Nov. 15, 1957  2 Sheets-Sheet 1
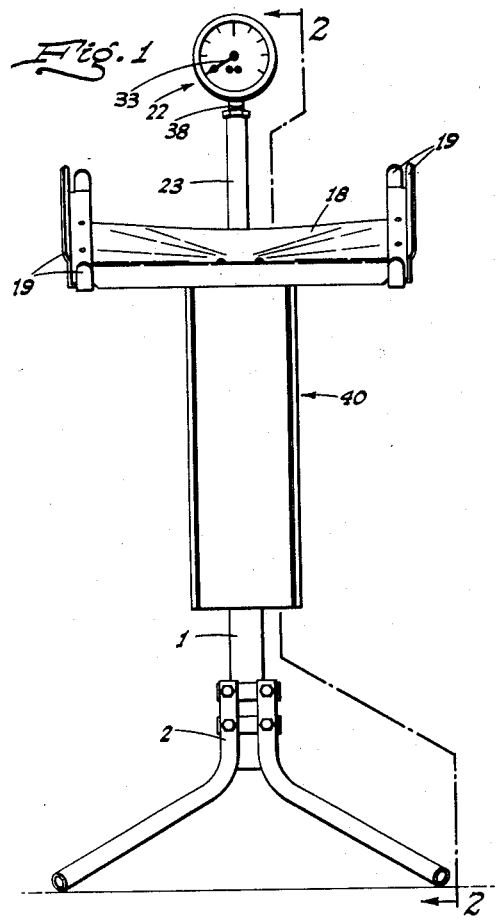
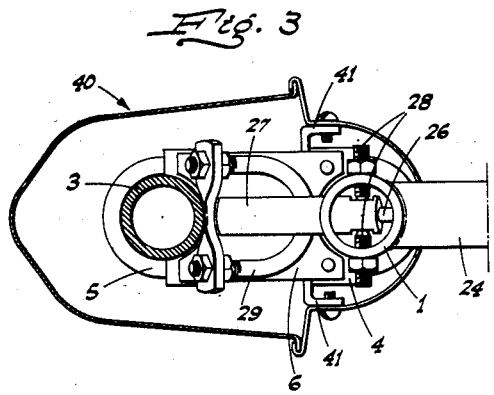
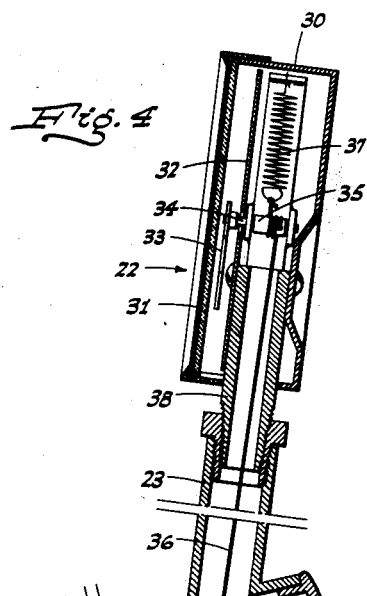
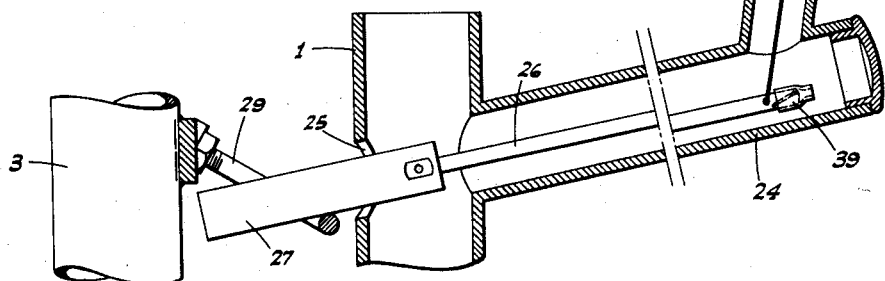
INVENTOR.
Theodore Heil
BY Webster & Webster
ATTYS.

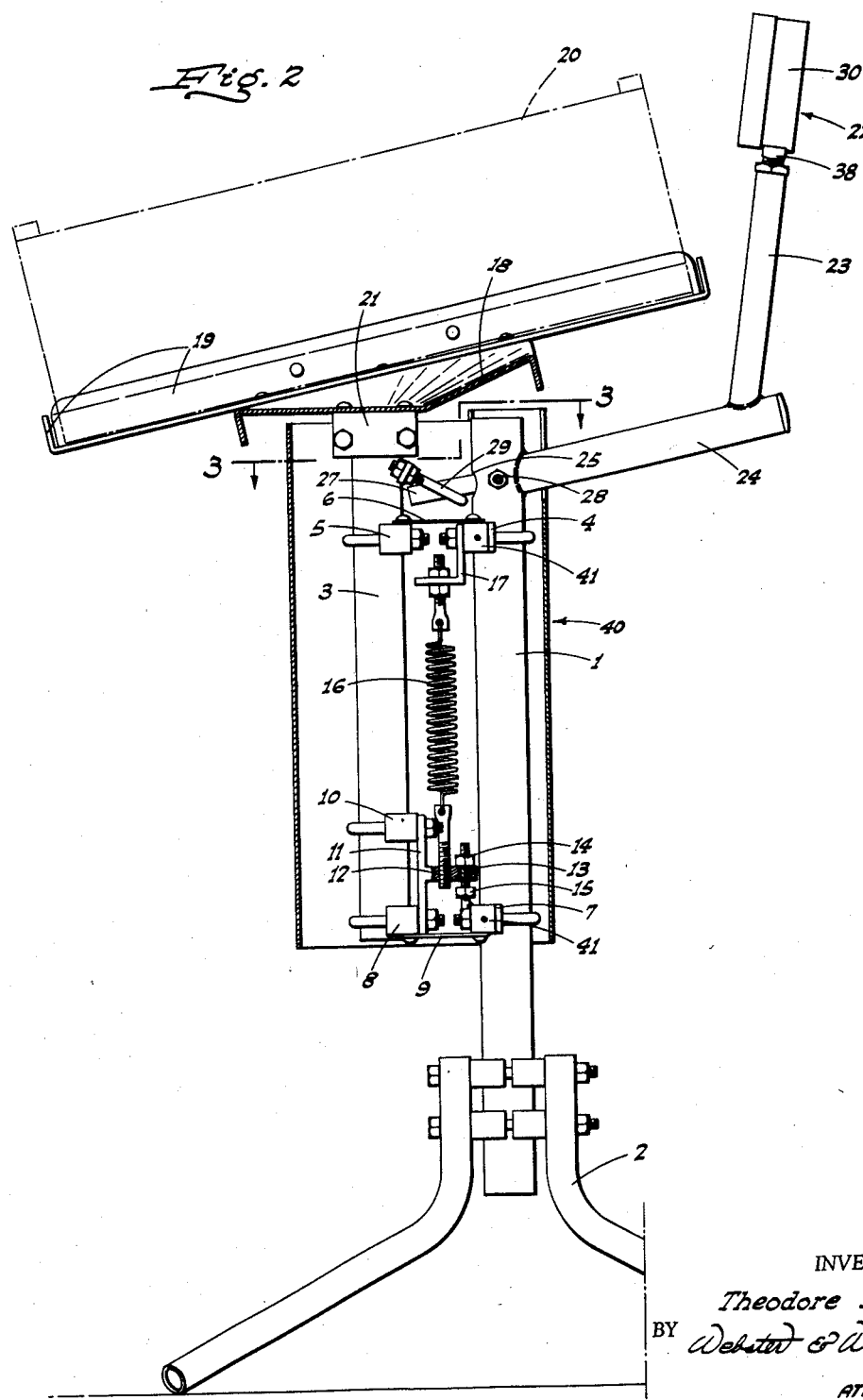

United States Patent Office 2,944,809
Patented July 12, 1960

2,944,809

PORTABLE PACKING SCALES

Theodore Heil, Lodi, Calif., assignor to Heilite Trailers, Lodi, Calif., a limited partnership Filed Nov. 15, 1957, Ser. No. 696,698

2 Claims. (Cl. 265—68)

The present invention is directed to, and it is a major object to provide, portable packing scales for use—in the field or packing shed—to support a produce box while being loaded, and to indicate when the load is of proper weight.

Another important object of the invention is to provide portable packing scales of relatively simple, lightweight construction so that the device is readily portable and can be easily transported to a field for use, and thereafter conveniently manually moved from point to point in the field as the harvest progresses; the device being especially designed—but not limited—for field packing of fresh grapes.

An additional object of the invention is to provide portable packing scales which embody a novel scale mechanism designed for ready and economical manufacture and assembly of the parts, and yet when in use function very satisfactorily for the purpose of indicating—within relatively close limits—the weight of the load of produce as packed in the supported box.

A further object of the invention is to provide portable packing scales, as above, in which the scale mechanism includes a novel weight gauge; the latter being disposed so that it is in a position so that it does not obstruct the operation, but is in clear view of the person packing the produce into the supported box.

It is also an object to provide portable packing scales which are practical, reliable, and durable, yet being extremely effective for the purpose for which they are designed.

These objects are accomplished by means of such structure and relative arrangement of parts as will fully appear by a perusal of the following specification and claims.

In the drawings:

Fig. 1 is a front elevation of the portable packing scales.

Fig. 2 is an enlarged sectional elevation taken substantially on line 2—2 of Fig. 1; a portion of the illustrated scale mechanism being in section.

Fig. 3 is a fragmentary sectional plan view taken on line 3—3 of Fig. 2.

Fig. 4 is a foreshortened fragmentary side elevation in section showing particularly the weight gauge, its mount, and the scale beam associated therewith.

Referring now more particularly to the drawings, and to the characters of reference marked thereon, the portable packing scales comprise a stationary post 1 of substantial height; such post being supported—from the lower end—by a spider leg base 2.

A relatively shorter, vertically movable or scale post 3 is disposed in spaced parallel relation in front of the stationary post 1; the posts 1 and 3 terminating at their upper ends in substantially the same horizontal plane, while the latter post terminates at its lower end in a plane above the spider leg base 2.

Adjacent but short of their upper ends the posts 1 and 3 are fitted with horizontally alined clamps 4 and 5, which are connected together by an upper spring metal plate 6. Similarly, such posts 1 and 3 are fitted, in substantially the plane of the lower end of the latter post, with clamps 7 and 8 connected together by a lower spring metal plate 9.

The spring metal plates 6 and 9 are parallel, and—by reason of their inherent resiliency—permit the scale post 3 to move vertically within certain limits; such movement of post 3 being limited by the following arrangement:

Another clamp 10 is secured to the post 3 in adjacent but spaced relation above the clamp 8, and said clamps 8 and 10 are connected by a vertical spanner bar 11 formed with a rearwardly projecting ear 12 which extends to a termination close to, but clear of, the post 1 at a point above the clamp 7.

An upstanding stop screw 13 fixed to the clamp 7 projects upwardly through an orifice in the ear 12; there being nuts 14 and 15 adjustably threaded on the stop screw 13 above and below—respectively—the ear 12.

A vertically adjustable tension spring 16 lies intermediate the posts 1 and 3, and is connected at its upper end to a bracket 17 attached to the clamp 4, and at its lower end to the ear 12. The tension spring 16 thus normally urges the scale post 3 to its uppermost limit of movement, and which is predetermined by adjustment of the upper stop nut 14. The downward limit of movement of the scale post 3 is predetermined by adjustment of the lower stop nut 15.

A forwardly and downwardly inclined, rectangular, box supporting platform unit 18 is disposed symmetrically above the scale post 3, and such platform unit includes box retention flanges 19 which actually receive, support, and locate a produce box 20 in a convenient position and height for loading.

The box supporting platform unit 18 is formed—centrally thereof and on the under side—with a fixed collar 21 secured to the upper end of the scale post 3.

At a central point some distance to the rear, and substantially above the platform unit 18, the scales include a forwardly facing weight gauge, indicated generally at 22, which is supported on an upstanding tube 23.

In turn the tube 23 is carried at its lower end on—and communicates with—a tube 24 which projects rearwardly, at a slight upward incline, from the upper portion of the stationary post 1. Such stationary post 1 is tubular, and at its inner end the tube 24 communicates with such post 1 at the rear of the latter; there being an orifice 25 in the front of post 1 substantially opposed to said tube 24.

A scale beam 26 is disposed in tube 24, extends through the post 1, and passes forwardly through orifice 25 to a front end termination a distance ahead of said post 1; the front or forward part of the scale beam 26 being enlarged or weighted, as at 27.

Opposed alined pivots 28, which extend in adjustable relation through opposite sides of the post 1, mount the scale beam 26 in said post 1 for free swinging motion about said pivots as an axis; the scale beam 26 tending to lower at the front end because of the enlarged or weighted forward portion 27. Such enlarged or weighted portion 27 of the scale beam 26 rests downwardly against a fixed yoke 29 attached to the scale post 3 and extending therefrom at a rearward and downward incline. The assembly of the scale beam 26 and yoke 29 is above, and in clearance relation to, the upper spring metal plate 6.

The weight gauge 22, which may be termed of windlass type, includes—within a case 30, and rearwardly of a transparent face 31—a dial 32 graduated in terms of weight, and upon which dial a pointer 33 is adapted to read. The pointer 33 is carried on a spindle 34 fitted with a spool 35 about which a flexible cord 36 is wound with a number of turns. Above the spool 35 the related end of the flexible cord 36 is connected to a relatively light-weight tension spring 37, while below the spool the flexible cord 36 extends downwardly through a gauge supporting neck 38 secured to the tube 23; such cord 36 also extending through said tube 23 and being adjustably connected to the adjacent end of the scale beam 26 by a connector 39.

The scale post 3, the corresponding portion of the stationary post 1, and the parts of the scale mechanism between such posts are encompassed, in protective relation, by a shield or guard assembly 40 suitably mounted in connection with said post 1, as at 41.

In use of the above described portable packing scales, and with a produce box 20 supported by the platform unit 18, the produce is packed into said box progressively, and with such packing the weight gradually moves the scale post 3 downwardly, and which downward movement is permitted by the spring metal plates 6 and 9, and which occurs against the tension of pre-adjusted spring 16.

With such downward movement of the scale post 3 the yoke 29 correspondingly lowers, and the engaged end of the scale beam 26 moves downwardly with it, with resultant upward movement of the outer end of said scale beam.

As the outer end of the scale beam 26 moves upwardly, such motion is translated to the flexible cord 36, and such cord—working under the influence of the tension spring 37—turns the spool 35, which rotates the spindle 34 and causes the pointer 33 to move relative to the dial 32; thus effectively indicating—by a reading of said pointer on said dial—the weight of the produce in the box 20.

After the box 20 is loaded to the desired weight it is removed, whereupon the scales return to their starting position, with ear 12 abutting the under side of the stop nut 14. The lower stop nut 15 normally does not come into play, and does so only if an excessive load is imposed on the scales. In such event the ear 12 abuts the lower stop nut 15 in order to prevent any possible overextension of—or damage to—the scale mechanism.

From the foregoing description it will be readily seen that there has been produced such a device as will substantially fulfill the objects of the invention, as set forth herein.

While this invention sets forth the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. A weighing scales comprising a supporting structure, a vertical scale post having a load supporting platform on its upper end, means mounting the post on the structure for yieldably resisted downward movement from a predetermined position of the platform when unloaded, a weight gauge mounted on the supporting structure, a mechanism arranged to actuate the gauge in response to downward movement of the post, said mechanism including a generally horizontal scale beam pivoted intermediate its ends on the supporting structure for swinging in a vertical plane, motion transmitting means operatively connected between one end of the scale beam and the weight gauge, the other end of the beam being weighted so that it tends to move downwardly by gravity and said last named means including an element on the scale post against which said other end of the scale beam rests from above.

2. A device, as in claim 1, in which said other end of the scale beam is alined with and terminates adjacent the scale post; said element comprising a downwardly inclined yoke which receives said other end of the scale beam.

References Cited in the file of this patent

UNITED STATES PATENTS

| 25,473 | Turnbull | Sept. 13, 1859 |
| 66,524 | Shaler | July 9, 1867 |
| 289,450 | Runge | Dec. 4, 1883 |
| 642,321 | Gilfillan | Jan. 30, 1900 |
| 650,994 | Spear | June 5, 1900 |
| 1,594,536 | Ludlow | Aug. 3, 1926 |
| 2,022,062 | Upp | Nov. 26, 1935 |
| 2,633,022 | Rosenberger et al. | Mar. 31, 1953 |
| 2,646,274 | Weckerly | July 21, 1953 |
| 2,699,932 | Knobel | Jan. 18, 1955 |
| 2,793,026 | Giardino et al. | May 21, 1957 |

FOREIGN PATENTS

| 6,586 | Great Britain | May 30, 1885 |
| 195,576 | Great Britain | Apr. 5, 1923 |